(12) United States Patent
Budd et al.

(10) Patent No.: US 9,958,625 B2
(45) Date of Patent: *May 1, 2018

(54) STRUCTURED SUBSTRATE FOR OPTICAL FIBER ALIGNMENT

(71) Applicant: International Business Machines Corporation, Armonk, NY (US)

(72) Inventors: Russell A. Budd, North Salem, NY (US); Paul F. Fortier, Quebec (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/600,853

(22) Filed: May 22, 2017

(65) Prior Publication Data
US 2017/0261706 A1    Sep. 14, 2017

Related U.S. Application Data

(60) Continuation of application No. 14/981,880, filed on Dec. 28, 2015, now Pat. No. 9,658,415, which is a
(Continued)

(51) Int. Cl.
*G02B 6/36* (2006.01)
*G02B 6/122* (2006.01)
(Continued)

(52) U.S. Cl.
CPC .............. *G02B 6/4243* (2013.01); *G02B 6/32* (2013.01); *G02B 6/3692* (2013.01); *G02B 6/423* (2013.01);
(Continued)

(58) Field of Classification Search
CPC ...... G02B 6/32; G02B 6/3682; G02B 6/4214; G02B 6/423; G02B 6/4238; G02B 6/4243;
(Continued)

(56) References Cited

U.S. PATENT DOCUMENTS 5,471,552 A * 11/1995 Wuu .................. G02B 6/136
216/24
5,907,791 A * 5/1999 Cappuzzo ........... H01L 21/0273
257/E21.026
(Continued)

FOREIGN PATENT DOCUMENTS

JP    2001318619 A    11/2001
JP    2003014995 A    1/2003

*Primary Examiner* — Ryan Lepisto
*Assistant Examiner* — Erin Chiem
(74) *Attorney, Agent, or Firm* — Daniel P. Morris; Otterstedt, Ellenbogen & Kammer, LLP

(57) ABSTRACT

A structured substrate for optical fiber alignment is produced at least in part by forming a substrate with a plurality of buried conductive features and a plurality of top level conductive features. At least one of the plurality of top level conductive features defines a bond pad. A groove is then patterned in the substrate utilizing a portion of the plurality of top level conductive features as an etch mask and one of the plurality of buried conductive features as an etch stop. At least a portion of an optical fiber is placed into the groove.

1 Claim, 14 Drawing Sheets

Related U.S. Application Data division of application No. 13/970,089, filed on Aug. 19, 2013, now Pat. No. 9,246,592.

(51) Int. Cl.

| | | |
|---|---|---|
| *G02B 6/42* | (2006.01) | |
| *G02B 6/12* | (2006.01) | |
| *G02B 6/32* | (2006.01) | |
| *G02B 6/132* | (2006.01) | |
| *H04B 10/40* | (2013.01) | |
| *H04B 10/2575* | (2013.01) | |
| *H04B 10/25* | (2013.01) | |

(52) U.S. Cl.
CPC ........... *G02B 6/425* (2013.01); *G02B 6/4214* (2013.01); *G02B 6/4238* (2013.01); *G02B 6/4257* (2013.01); *H04B 10/2504* (2013.01); *H04B 10/2575* (2013.01); *H04B 10/40* (2013.01); *G02B 6/3636* (2013.01); *G02B 6/3652* (2013.01); *G02B 6/4274* (2013.01); *Y10T 29/4913* (2015.01); *Y10T 29/49144* (2015.01); *Y10T 29/49155* (2015.01)

(58) Field of Classification Search
CPC .... G02B 6/425; G02B 6/4257; G02B 6/3636; G02B 6/3652; G02B 6/4274; H04B 10/2504; H04B 10/2575; H04B 10/40
See application file for complete search history.

(56) References Cited

U.S. PATENT DOCUMENTS

| | | | | |
|---|---|---|---|---|
| 6,025,209 | A * | 2/2000 | Wuu | B81C 1/00047 438/53 |
| 6,181,854 | B1 * | 1/2001 | Kojima | G02B 6/4239 385/49 |
| 6,296,789 | B1 * | 10/2001 | Go | G02B 6/421 264/1.25 |
| 6,341,190 | B1 | 1/2002 | Summersgill et al. | |
| 6,516,448 | B1 * | 2/2003 | Vieider | G02B 6/423 716/50 |
| 6,754,407 | B2 | 6/2004 | Chakravorty et al. | |
| 6,845,184 | B1 | 1/2005 | Yoshimura et al. | |
| 6,975,514 | B2 | 12/2005 | Morris | |
| 7,665,908 | B2 | 2/2010 | Nelson et al. | |
| 8,231,284 | B2 | 7/2012 | Doany et al. | |
| 9,246,592 | B2 | 1/2016 | Budd | |
| 2004/0054822 | A1 | 3/2004 | Biran et al. | |
| 2004/0179796 | A1 | 9/2004 | Jakobsen et al. | |
| 2005/0052855 | A9 * | 3/2005 | Behammer | H01L 21/822 361/763 |
| 2005/0110157 | A1 * | 5/2005 | Sherrer | G02B 6/4201 257/776 |
| 2009/0294401 | A1 * | 12/2009 | Chen | H01L 21/4857 216/20 |
| 2012/0321250 | A1 | 12/2012 | Yamaji et al. | |
| 2013/0177281 | A1 | 7/2013 | Kosenko et al. | |
| 2014/0193116 | A1 | 7/2014 | Bylander et al. | |
| 2015/0050028 | A1 | 2/2015 | Budd et al. | |
| 2016/0116691 | A1 | 4/2016 | Budd et al. | |
| 2016/0116692 | A1 | 4/2016 | Budd et al. | |

* cited by examiner

STRUCTURED SUBSTRATE FOR OPTICAL FIBER ALIGNMENT

CROSS-REFERENCE TO RELATED APPLICATIONS

This patent application is a continuation of U.S. patent application Ser. No. 14/981,880 filed Dec. 28, 2015 entitled "STRUCTURED SUBSTRATE FOR OPTICAL FIBER ALIGNMENT," which is in turn a divisional of U.S. patent application Ser. No. 13/970,089 filed Aug. 19, 2013, entitled "STRUCTURED SUBSTRATE FOR OPTICAL FIBER ALIGNMENT," now U.S. Pat. No. 9,246,592. The complete disclosures of the aforementioned U.S. patent applications Ser. Nos. 13/970,089 and 14/981,880 are expressly incorporated herein by reference in their entireties for all purposes.

STATEMENT OF GOVERNMENT RIGHTS

Not Applicable

FIELD OF THE INVENTION

The present invention relates to the electrical, electronic and computer arts, and, more particularly, to optical fibers and optoelectronic devices.

BACKGROUND OF THE INVENTION

The performance of computer systems continues to improve as the number of processing cores increases. However, this increase in the number of processors also requires a corresponding improvement in a system's interconnect bandwidth in order for the full performance advantage to be realized.

Fiber optic data links, when packaged close to a processor and/or a switch chip, provide dramatic improvements in interconnect bandwidth and enable high speed data communications over greater distances. Fiber optic data links are typically facilitated by the use of optical transceivers. Quad Small Form-factor Pluggable (QSFP or QSFP+) optical transceivers are, for example, frequently utilized to interface switches, routers, media converters, and similar devices to optical fibers. The QSFP+ specification supports Serial Attached SCSI (SAS), Ethernet, Fibre Channel, Infiniband, and other communication applications. Each of the four transceiver channels may operate at a data rate of 1 to 10.5 gigabits per second and support a reach of up to 100 meters.

SUMMARY OF THE INVENTION

Aspects of the invention provide methods of forming apparatus that are adapted to couple optoelectronic devices with optical fibers, while providing precise alignment therebetween. Advantageously, these embodiments may have small part counts and may be fabricated using relatively straightforward and low cost processing methodologies.

In accordance with an aspect of the invention, a structured substrate for optical fiber alignment is produced at least in part by forming a substrate with a plurality of buried conductive features and a plurality of top level conductive features. At least one of the plurality of top level conductive features defines a bond pad. A groove is then patterned in the substrate utilizing a portion of the plurality of top level conductive features as an etch mask and one of the plurality of buried conductive features as an etch stop. At least a portion of an optical fiber is placed into the groove.

Moreover, in accordance with another aspect of the invention, an apparatus is produced at least in part by forming a substrate with a plurality of buried conductive features and a plurality of top level conductive features. At least one of the plurality of top level conductive features defines a bond pad. A groove is then patterned in the substrate utilizing a portion of the plurality of top level conductive features as an etch mask and one of the plurality of buried conductive features as an etch stop. At least a portion of an optical fiber is placed into the groove.

DETAILED DESCRIPTION OF PREFERRED EMBODIMENTS

The present invention will be described with reference to illustrative embodiments. For this reason, numerous modifications can be made to these embodiments and the results will still come within the scope of the invention. No limitations with respect to the specific embodiments described herein are intended or should be inferred.

As used herein, the terms "conductive" and "insulating" are intended to mean electrically conductive and electrically insulating, respectively, unless specifically stated otherwise.

Figure 1:
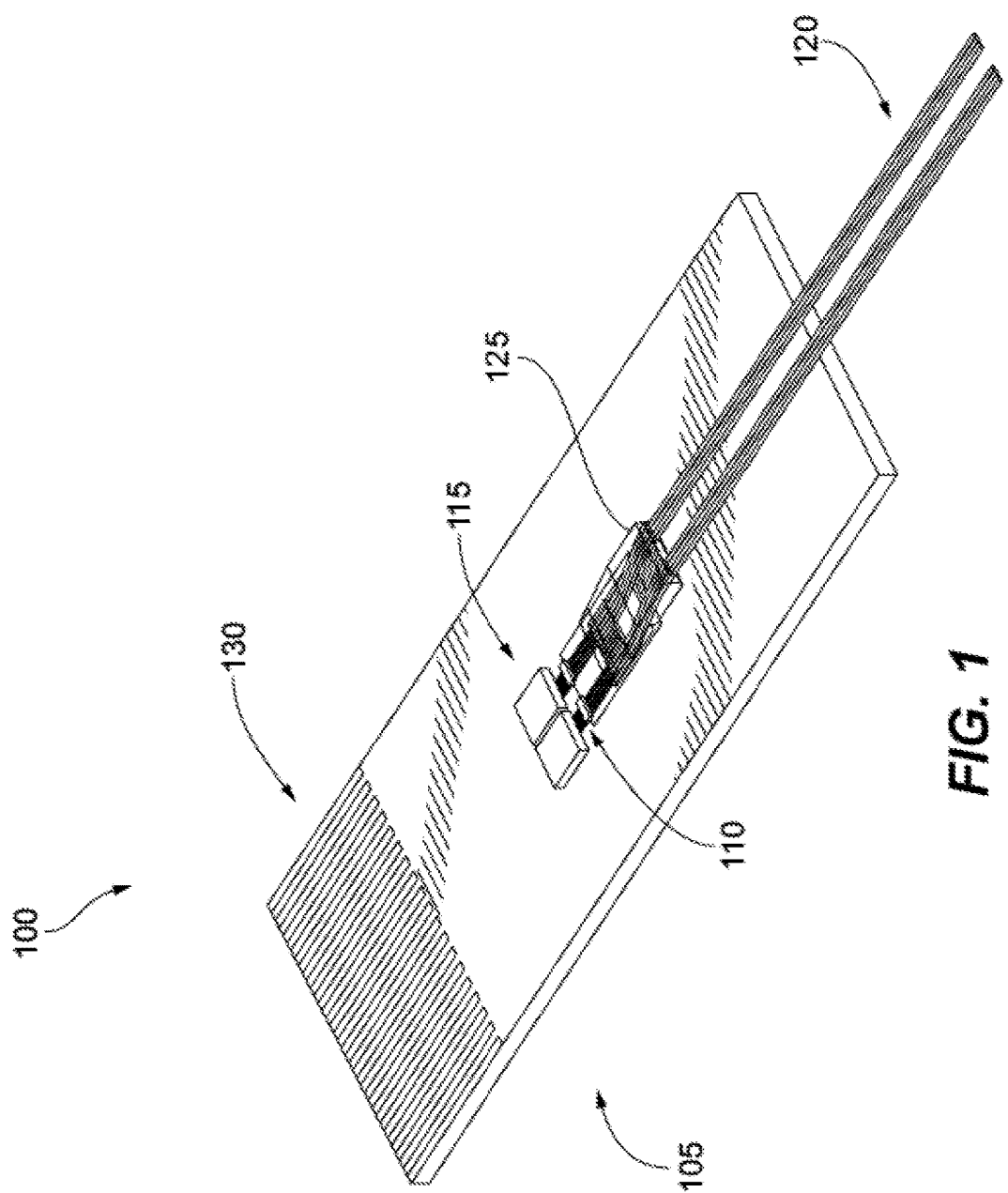
FIG. 1 shows a perspective view of an optical transceiver in accordance with a first illustrative embodiment of the invention.

FIG. 1 shows a perspective view of an apparatus in accordance with an illustrative embodiment of the invention. For purposes of describing aspects of the invention, the apparatus forms a portion of an optical transceiver 100. Nevertheless, it is emphasized that aspects of the invention are more generally applicable to any application wherein optical fibers terminate in a substrate and need to be precisely aligned with one or more optoelectronic devices mounted thereon.

The non-limiting, illustrative optical transceiver 100 comprises a substrate 105, two optoelectronic devices 110, and two integrated circuits 115. Eight optical fibers 120 form four receive and four transmit channels, and, after being received by the substrate 105, are routed through a fiber holder 125. After leaving the fiber holder 125, the optical fibers 120 ultimately terminate immediately underneath the two optoelectronic devices 110. At the opposite end of the substrate 105, a set of exposed conductive lines form a module edge connector 130, which allows the optical transceiver 100 to interface with an external system.

Figure 2:
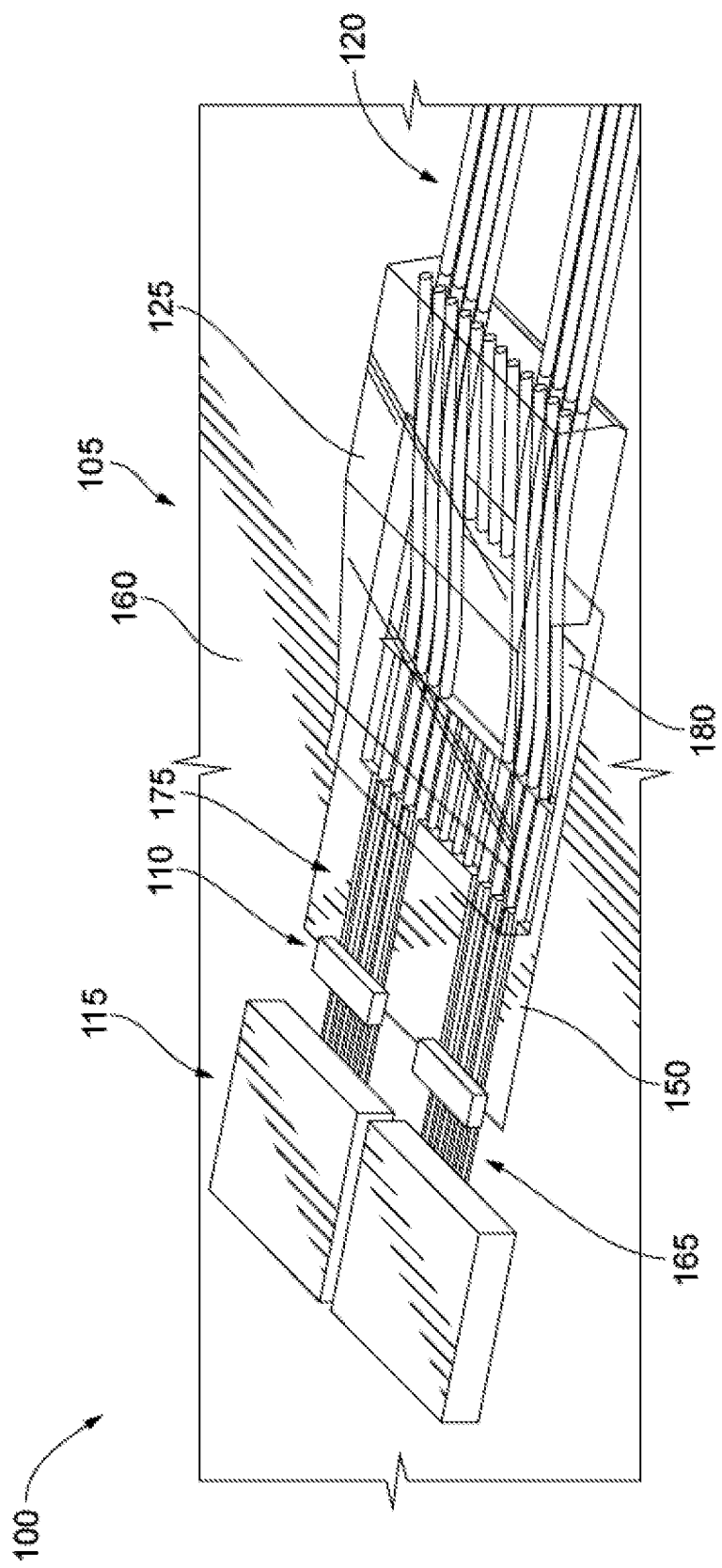
FIG. 2 shows a magnified perspective view of a portion of the FIG. 1 optical transceiver.
Figure 3:
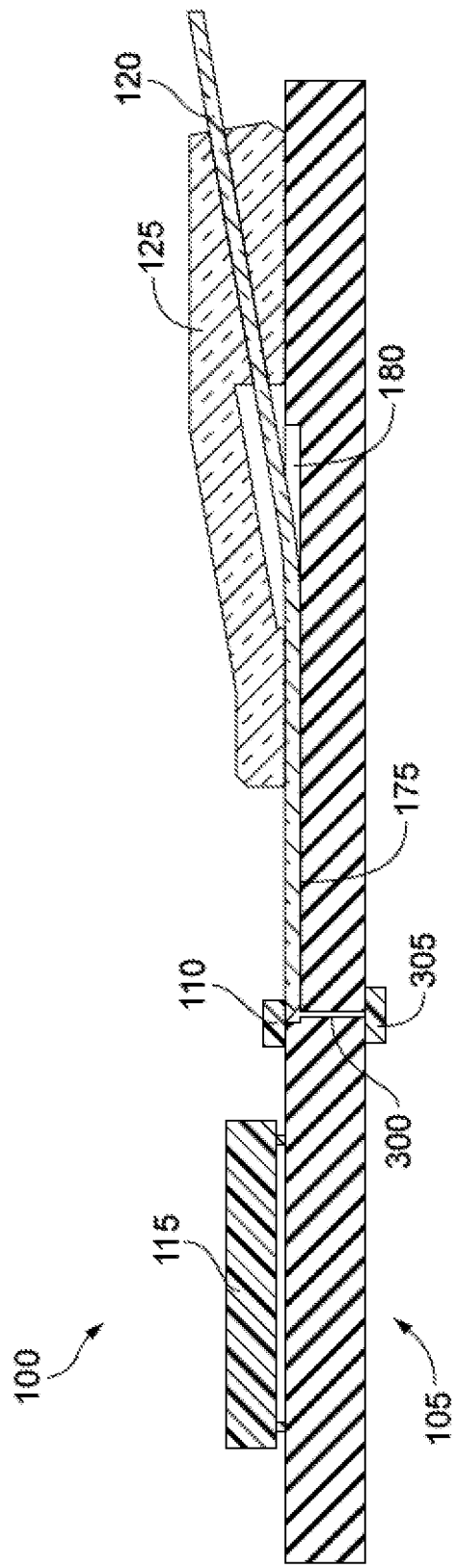
FIG. 3 shows a sectional view of a portion of the FIG. 1 optical transceiver.
Figure 4:
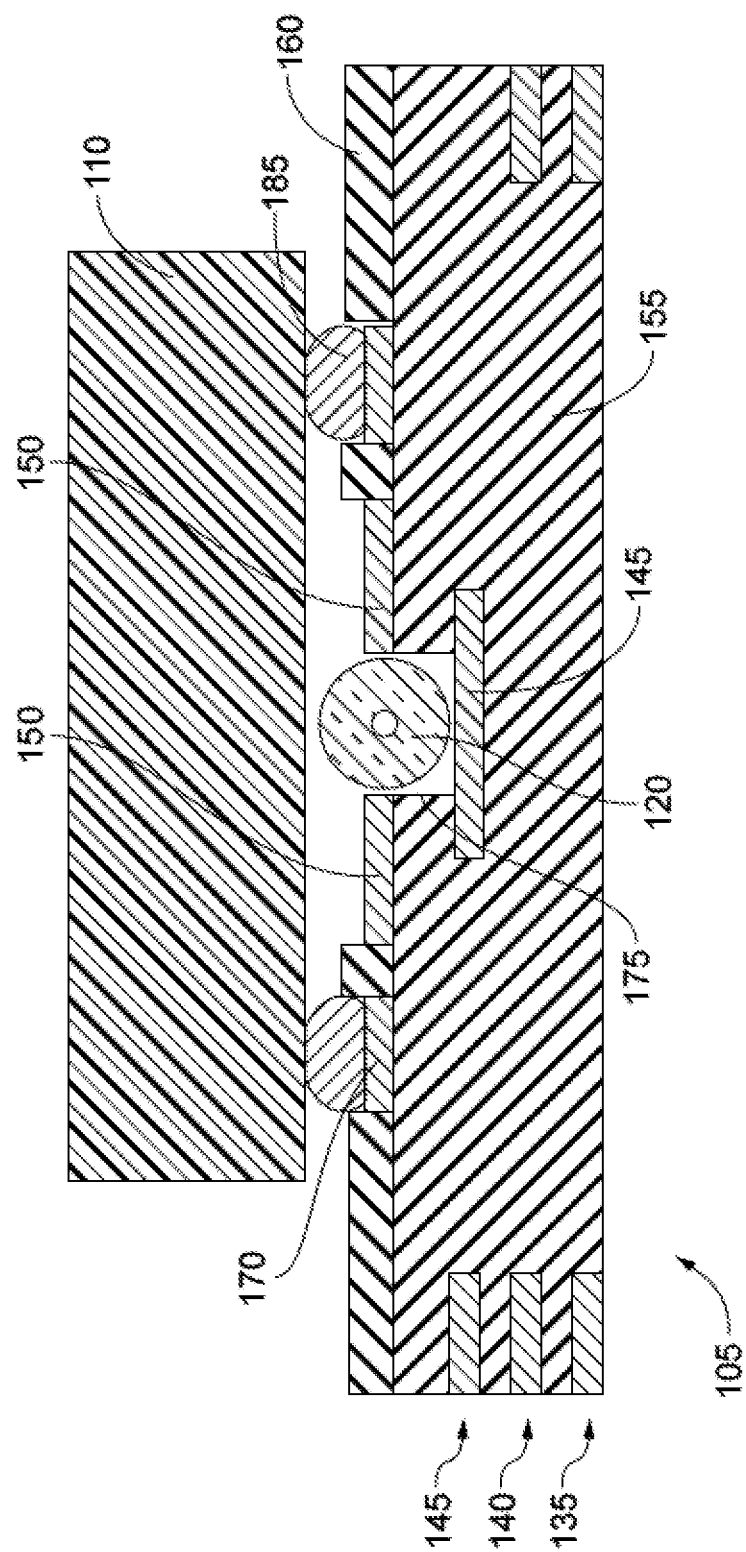
FIG. 4 shows a sectional view of an illustrative structure similar to the FIG. 1 optical transceiver.

Additional aspects of the optical transceiver 100 are further elucidated in FIGS. 2-4, where FIG. 2 shows a magnified perspective view of a portion of the optical transceiver 100, and FIG. 3 shows a sectional view cut along the longitudinal axis of one of the optical fibers 120. FIG. 4, moreover, shows a sectional representation transverse to an optical fiber of an illustrative structure similar to the optical transceiver 100 that highlights the relationship between the optical fibers 120 and an overlying optoelectronic device 110 (and is therefore marked with like reference numerals). The substrate 105 supports both electrical interconnections between the optoelectronic devices 110, the integrated circuits 115, and the module end connector 130, as well as optical interconnections between the optoelectronic devices 110 and the optical fibers 120. For purposes of providing electrical interconnections between the optoelectronic devices 110, the integrated circuits 115, and the module end connector 130, the substrate 105 comprises four levels of electrically conductive features: first level conductive features 135, second level conductive features 140, third level conductive features 145, and top level conductive features 150. These conductive features 135, 140, 145, 150 are separated both laterally and vertically by insulating material 155 (i.e., dielectric material), while also being interconnected vertically by vertical vias (not specifically shown) so as to form the desired electrical pathways. At the same time, the top level conductive features 150 are separated laterally from each other by a top insulating layer 160, but are otherwise exposed. Exposed regions of the top level conductive features 150 form electrical traces 165, visible between the optoelectronic devices 110 and the integrated circuits 115. Moreover, the top level conductive features 150 form bond pads 170 required to couple these devices 110, 115 to the substrate 105. Lastly, additional top level conductive features 150 also define the module edge connector 130.

For purposes of providing the required optical interconnections between the optoelectronic devices 110 and the optical fibers 120, moreover, the substrate 105 further defines a set of eight grooves 175 and a larger trench 180. A respective end portion of each of the optical fibers 120 is located in a respective one of the grooves 175, and the fiber holder 125 is partially disposed within the trench 180. For reasons detailed below, each of the upper edges of the grooves 175 and the trench 180 are abutted by respective top level conductive features 150. Moreover, the bottoms of each of the grooves 175 and the trench 180 are formed by respective third level conductive features 145.

Lastly, the optoelectronic devices 110 and the integrated circuits 115 in the illustrative optical transceiver 100 are connected to the bond pads 170 on the substrate 105 via solder balls 185 (i.e., the devices 110, 115 are flip-chipped to the substrate 105). The solder balls 185 serve several functions. They mount the devices 110, 115 to the substrate 105; provide conductive electrical pathways between the devices 110, 115 and the substrate 105; and dissipate heat from the devices 110, 115 to the substrate 105. Given that the illustrative device is an optical transceiver, one of the optoelectronic devices 110 may comprise four photodetectors (e.g., silicon photodiodes, indium gallium arsenide photodiodes, avalanche photodiodes), while the other optoelectronic device 110 may comprise four light sources (e.g., light emitting diodes (LEDs), Fabry-Perot lasers, distributed feedback lasers, vertical cavity surface-emitting lasers (VCSELs)). The optical transceiver 100 is therefore able to receive light signals over four channels and to transmit light signals over four channels.

Figure 5:
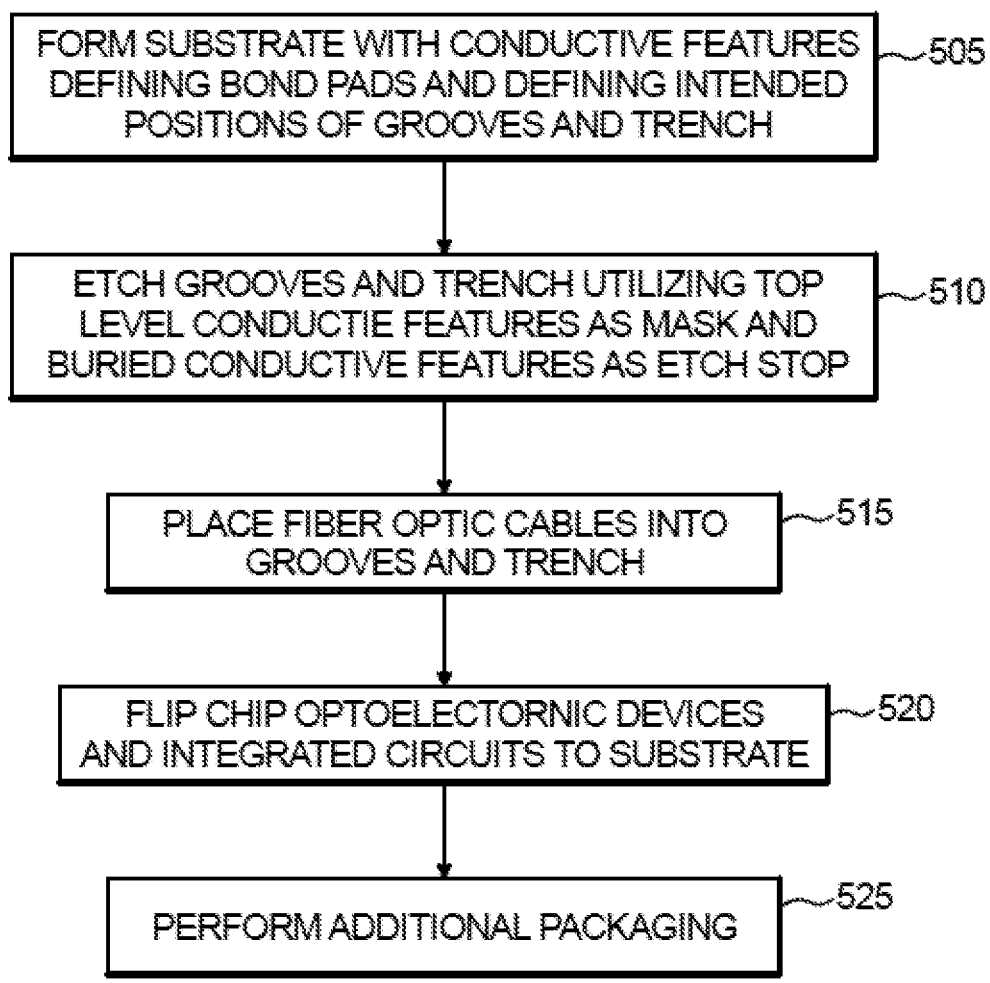
FIG. 5 shows a flow diagram of a method for forming the FIG. 1 optical transceiver, in accordance with an illustrative embodiment of the invention.

FIG. 5 goes on to show a flow diagram of a method 500 for forming the above-described optical transceiver 100, in accordance with an illustrative embodiment of the invention. Advantageously, the method 500 utilizes a novel combination of design and processing steps to allow the grooves 175 and the trench 180 to be self-aligned to the bond pads 170. This self-alignment, in turn, helps to assure that the ends of the optical fibers 120 are ultimately positioned correctly in relation to the optoelectronic devices 110 so as to create efficient optical communications therebetween. At the same time, this passive alignment is accomplished by a relatively straightforward and low cost processing scheme, while also creating an optical transceiver 100 with a relatively small part count.

Step 505 of the method 500 comprises forming the substrate 105, which, in the present illustrative embodiment, may comprise a surface laminar circuit ("SLC"; also sometimes called a "sequential build-up" (SBU) circuit board). SLCs are presently widely used in telecommunication and video camcorder products, and thus their formation will already be familiar to one having ordinary skill in the packaging arts. Moreover, a representative method of forming SLCs is taught in U.S. Pat. No. 5,451,721 to Tsuchida et al., entitled "Multilayer Printed Circuit Board and Method for Fabricating Same," which is hereby incorporated by reference herein. In the present embodiment, the insulating material 155 and the top insulating layer 160 may, as just one example, comprise an epoxy, while the conductive features 135, 140, 145, 150 may comprise, as just another example, a metal such as copper.

The conductive features 135, 140, 145, 150 in the substrate 105 serve at least five purposes: 1) defining the bond pads 170 that facilitate the connections of the optoelectronic devices 110 and the integrated circuits 115 to the substrate 105; 2) defining the module end connector 130; 3) defining the electrical traces 165 (both internal and external) and vertical vias that route electrical signals between the optoelectronic devices 110, the integrated circuits 115, and the module end connector 130; 4) acting as a mask for the formation of the grooves 175 and the trench 180 associated with the placement of the optical fibers 120; and 5) acting as etch stops for these same grooves 175 and trench 180. Accordingly, these various functions are preferably considered when laying out the several layers of conductive features 135, 140, 145, 150. To utilize a portion of the top level conductive features 150 as an etch mask for the grooves 175 and the trench 180, for example, the top level conductive features 150 are preferably patterned in those regions of the substrate 105 where the grooves 175 and the trench 180 are to be placed such that the top level conductive features 150 occupy the edges of the intended grooves 175 and trench 180. That is, the top level conductive features 150 are patterned in the shape of a developed photoresist mask in relation to the intended grooves 175 and trench 180. At the same time, to further utilize the conductive features 135, 140, 145, 150 as an etch stop for the grooves 175 and the trench 180, buried conductive features (in this particular embodiment, third level conductive features 145) are preferably placed in the same regions of the substrate 105 where the grooves 175 and the trench 180 are intended so that the buried conductive features will fall at the bottoms of the grooves 175 and the trench 180.

Figure 6:
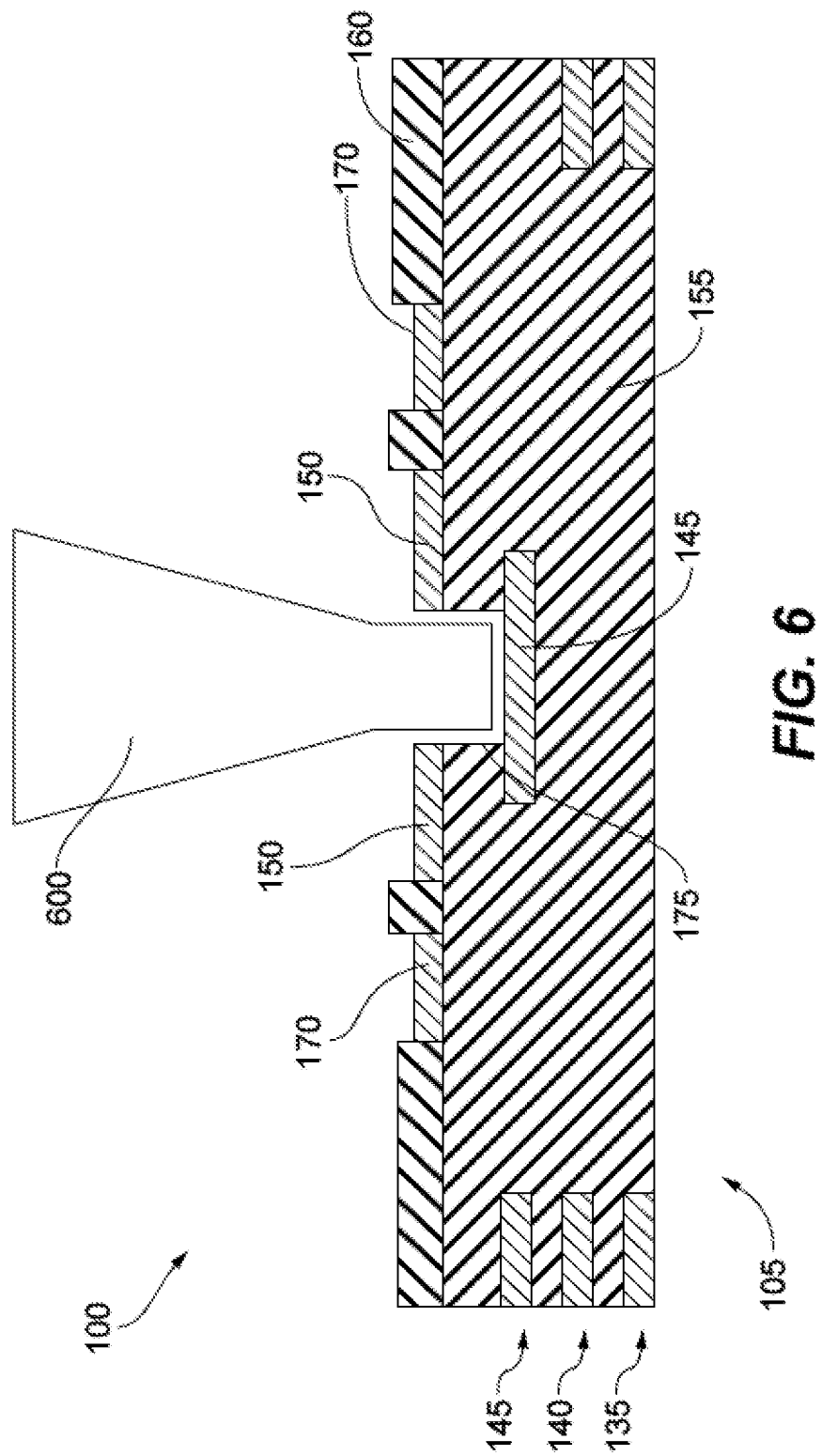
FIG. 6 shows a sectional view of an etching process in the FIG. 5 method.

With the conductive features 135, 140, 145, 150 so patterned, forming the grooves 175 and the trench 180 simply becomes a process of etching the regions of the substrate 105 where the grooves 175 and the trench 180 are intended utilizing the top level conductive features 150 as an etch mask and the third level conductive features 145 as an etch stop. Such a process is set forth in step 510 of the method 500, and is illustrated in a sectional view in FIG. 6. Etching may be accomplished by, for example, laser ablation using, as just one example, a carbon dioxide ($CO_2$) laser (labeled in FIG. 6 as laser 600). Because of their inherent reflectivity, metal features are particularly good masks and etch stops for many laser ablation processes. Advantageously, the use of the top level conductive features 150 in this manner self-aligns the grooves 175 and the trench 180 to the bond pads 170, which are likewise defined by the top level conductive features 150. The use of an etch stop also allows the grooves 175 and the trench 180 to be fabricated with much greater depth uniformity than would be available in, for example, a timed etching process.

Figure 7:
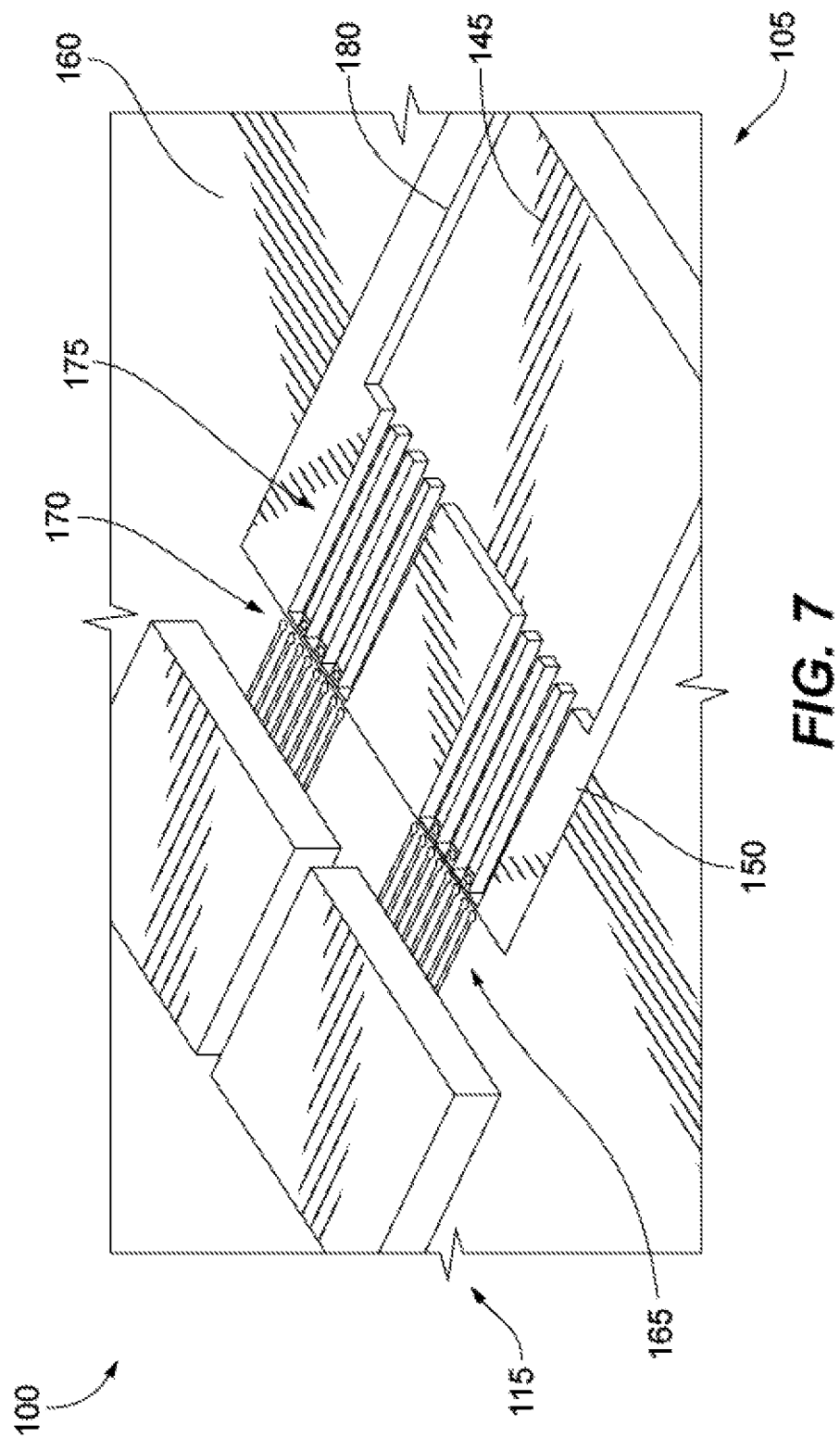
FIG. 7 shows a perspective view of a portion of the FIG. 1 optical transceiver during formation using the FIG. 5 method.
Figure 8:
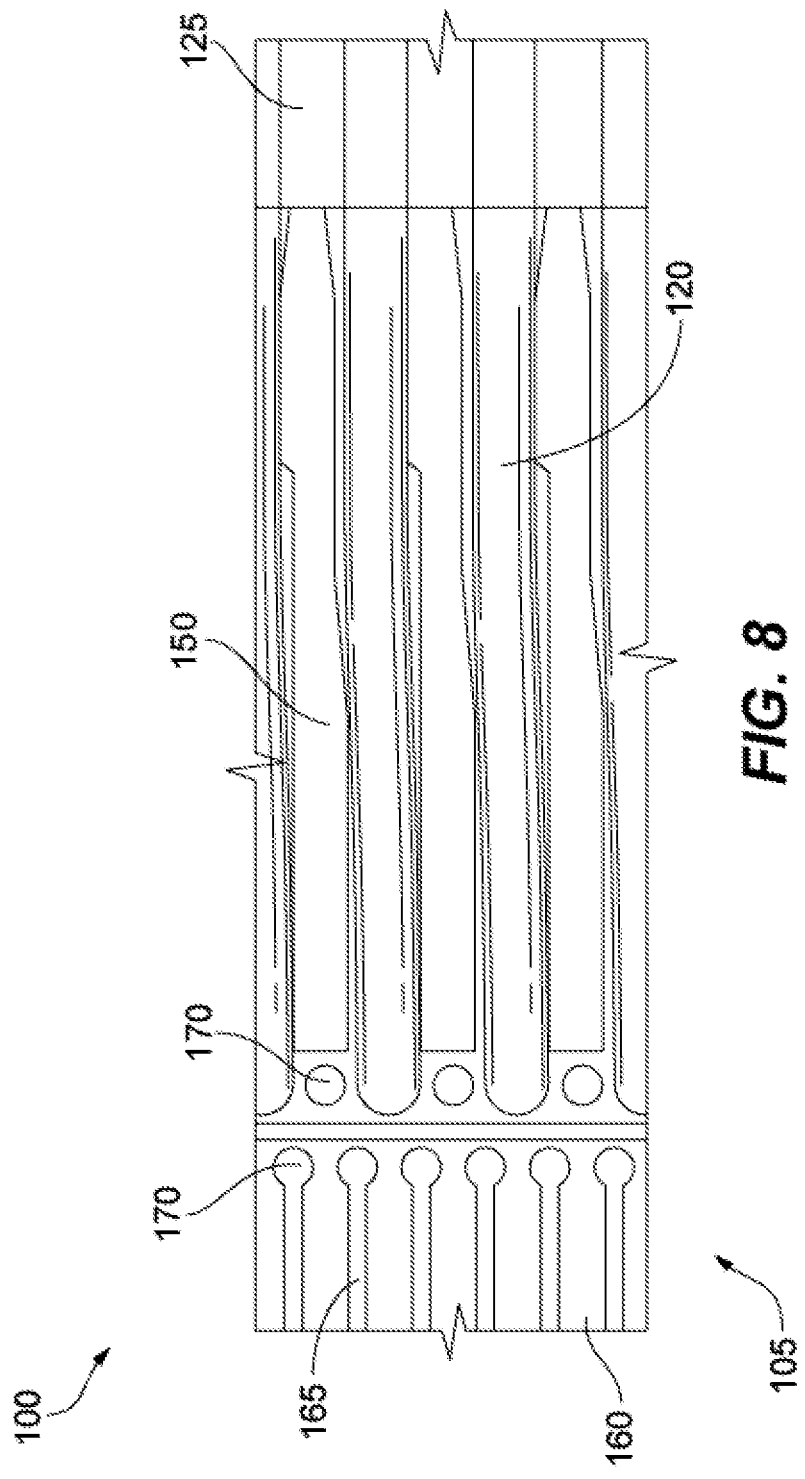
FIG. 8 shows a perspective top view of a portion of the FIG. 1 optical transceiver during formation using the FIG. 5 method.

After forming the grooves 175 and the trench 180, the substrate 105 appears as shown in perspective view in FIG. 7. In step 515, the ends of optical fibers 120 are placed into the grooves 175 while the fiber holder 125 is partially placed into the trench 180. The ends of the optical fibers 120 are thereby precisely placed in relation to the bond pads 185 that will support the optoelectronic devices 110. FIG. 8 shows a top view of a portion of the optical transceiver 100 at this point in the processing, which diagrammatically shows this relationship. In step 520, the optoelectronic devices 110 and the integrated circuits 115 are flip chipped to the substrate 105, resulting in the optical transceiver 100 shown in FIGS. 1-3. The process of flip chipping will already be familiar to one skilled in the packaging arts. Flip chip attachment is also described in, for example, H-M Tong et al., *Advanced Flip Chip Packaging,* Springer, 2012, which is further hereby incorporated by reference herein.

Figure 9:
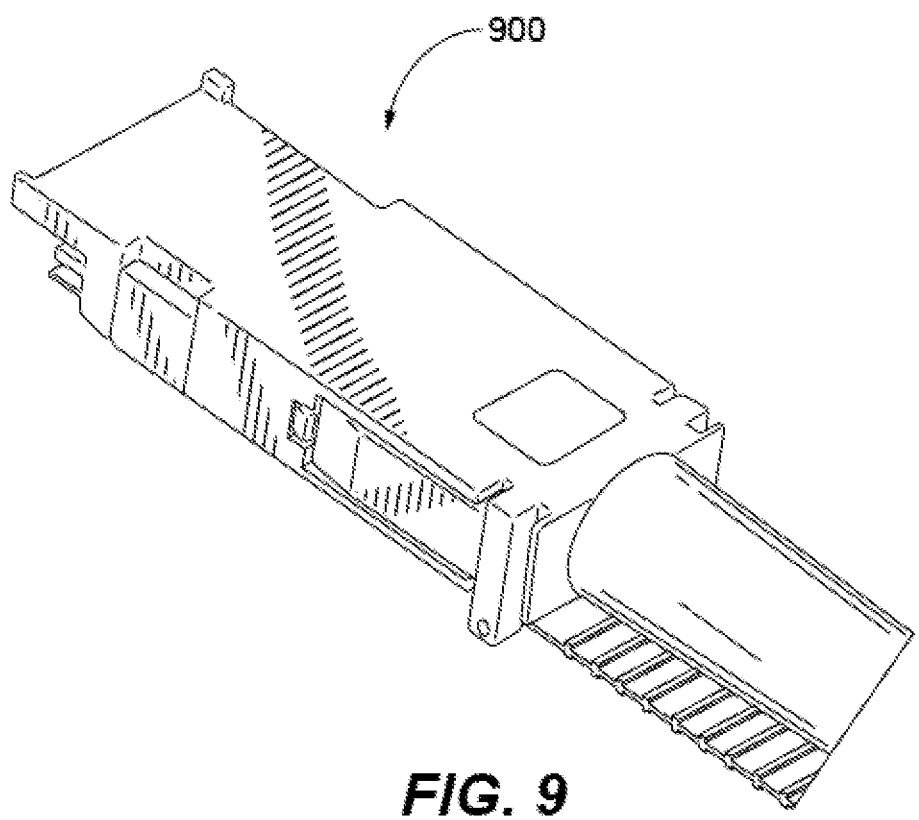
FIG. 9 shows a perspective view of an illustrative package that may be used with the FIG. 1 optical transceiver, in accordance with an illustrative embodiment of the invention.

Lastly, with the optical transceiver 100 formed as described above, it may be further packaged, as indicated in step 525. FIG. 9 shows a perspective view of an illustrative package 900 that may be used with the optical transceiver 100. This illustrative package 900 defines a QSFP+ Power Active Optical Cable connector in accordance with the SFF-8436 Specification (promulgated by the SFF Committee).

If so desired, the optical transceiver 100 lends itself to the placement of a backside monitor photodetector. This option is diagrammatically illustrated in FIG. 3. Here, an empty via 300 is formed immediately underneath the terminus of the optical fiber 120. A backside photodiode 305 is then placed so that it can detect light emitted from the optical fiber 120 through the empty via 300.

Figure 10:
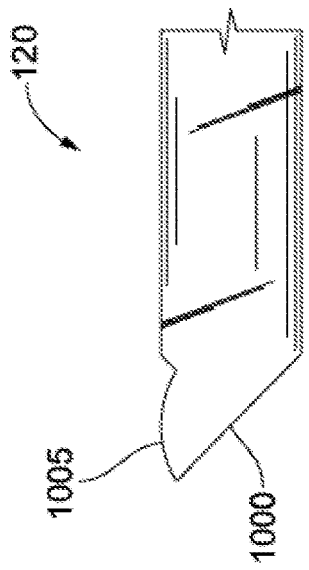
FIG. 10 shows a perspective view of a portion of an optical fiber with a mirror and lens, in accordance with an illustrative embodiment of the invention.
Figure 11:
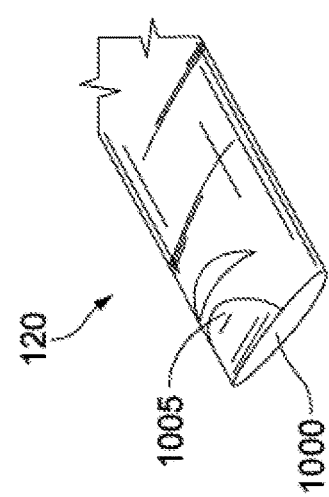
FIG. 11 shows a side perspective view of the FIG. 10 optical fiber portion.
Figure 12:
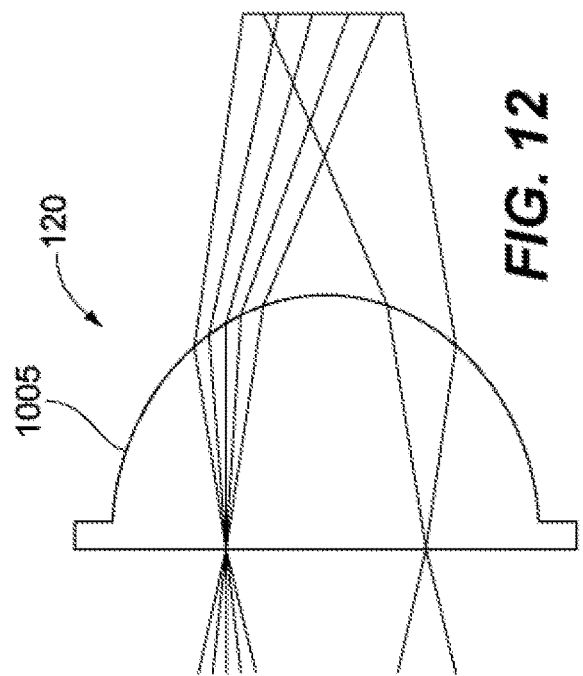
FIG. 12 shows a ray tracing diagram for the FIG. 10 lens.

Moreover, as another option, one or more of the optical fibers 120 in the illustrative optical transceiver 100 may be cleaved to form a total internal reflection (TIR) mirror and/or a lens that may aid in directing light signals between the optical fiber 120 and its corresponding overlying optoelectronic device 110. FIGS. 10 and 11 show an oblique perspective view and a perspective side view, respectively, of an optical fiber 120 with both a TIR mirror 1000 and a lens 1005 formed thereon. Both features 1000, 1005 may be formed by conventional laser cleaving. The TIR mirror 1000 is preferably angled so as to reflect the light at an angle of about 90 degrees. The lens 1005, in turn focuses the light onto a plane some distance from the lens 1005. FIG. 12 shows a ray tracing diagram of light at various positions in the core of the optical fiber 120 being effectively focused onto a plane. In one or more embodiments, a photodiode may be positioned at this plane to receive light from the optical fiber 120.

Figure 13:
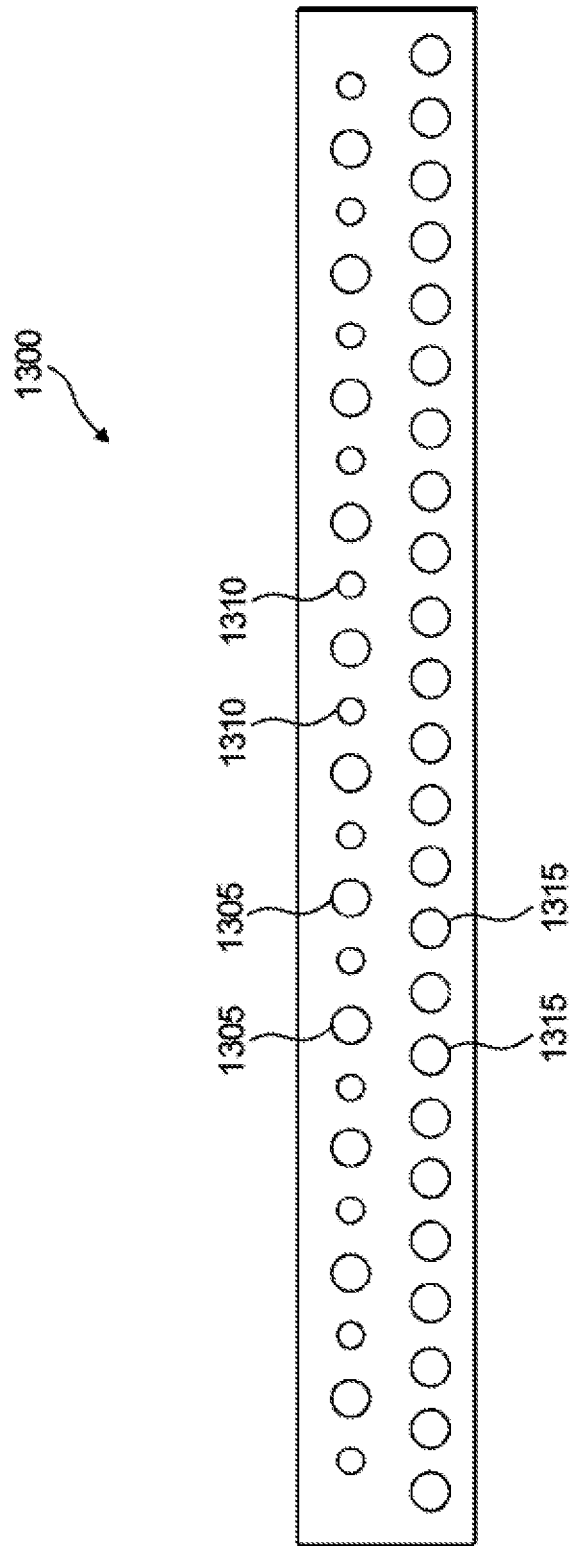
FIG. 13 shows a diagrammatic representation of the underside of an optoelectronic device, in accordance with an illustrative embodiment of the invention.

While the illustrative optical transceiver 100 services four transmit and four receive channels via eight optical fibers 120, alternative embodiments falling within the scope of the invention may also service fewer or greater numbers of optical fibers. FIG. 13, for example, shows a diagrammatic representation of the underside of an optoelectronic device 1300 operative to service twelve optical fibers. In this illustrative, non-limiting embodiment, one row of alternating active regions 1305 and bond pads 1310 run along one lengthwise edge of the optoelectronic device 1300. In use, this row would overlie the termini of the optical fibers disposed in their respective grooves. A row of bond pads 1315 run along the other lengthwise edge. The active regions 1305 may comprise, for example, photodetectors (e.g., photodiodes) or light sources (e.g., LEDs, lasers).

In the optical transceiver 100, the optoelectronic devices 110 overlie the ends of the optical fibers 120. In alternative embodiments falling within the scope of the invention, however, the optical fibers may terminate short of the optoelectronic devices and the transmission of light signals therebetween may be facilitated by intervening optical waveguides.

Figure 14:
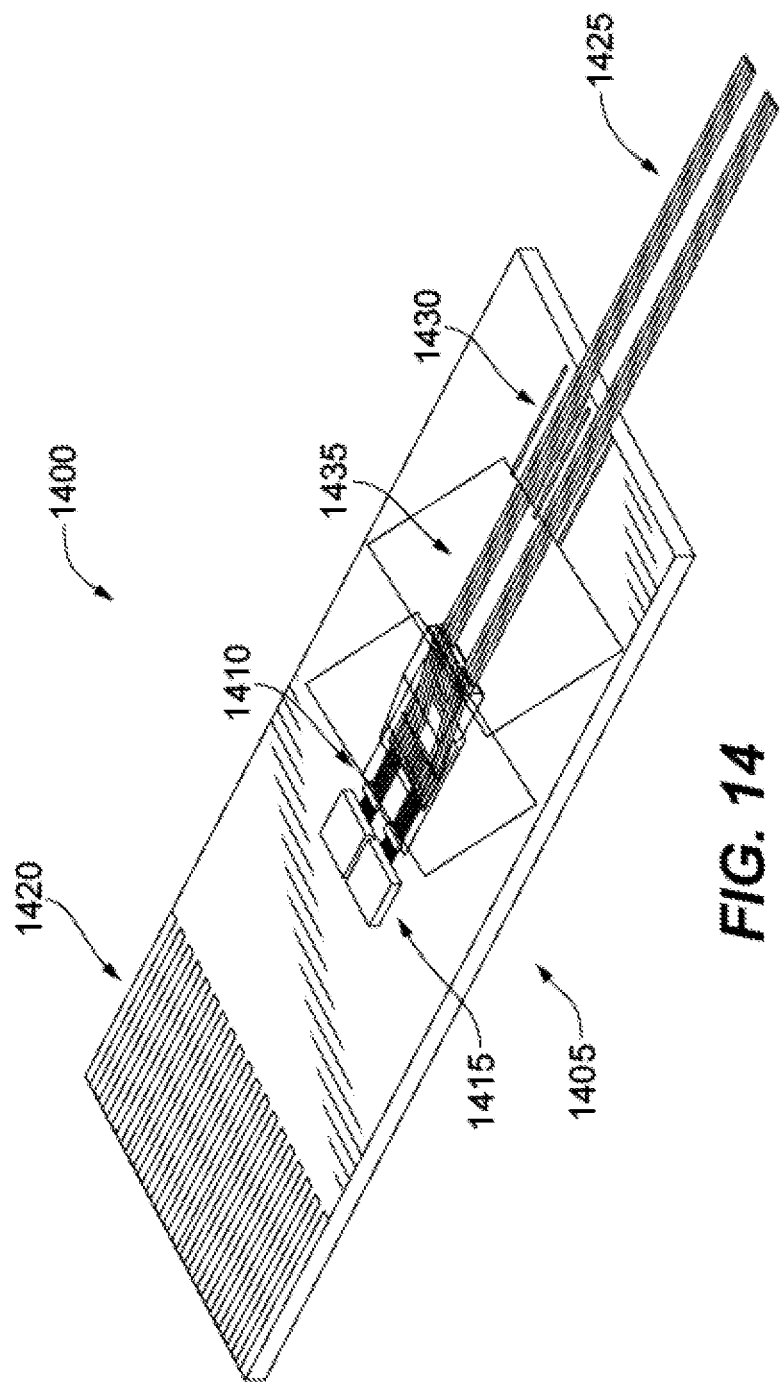
FIG. 14 shows a perspective view of an alternative optical transceiver, in accordance with a second illustrative embodiment of the invention.

FIG. 14 shows a perspective view of aspects of an alternative optical transceiver 1400 that is designed in this manner, in accordance with a second illustrative embodiment of the invention. The non-limiting, illustrative optical transceiver 1400 comprises a substrate 1405 (e.g., an SLC), two optoelectronic devices 1410 (e.g., a photo detector and a light source), two integrated circuits 1415, and a module end connector 1420. Eight optical fibers 1425 form four receive and four transmit channels, and, in a manner similar to the optical transceiver 100, occupy respective grooves 1430 in the substrate 1405. The optical fibers 1425 terminate so as to abut a set of waveguides 1435 that route light signals between the optical fibers 1425 and the optoelectronic devices 1410.

Figure 15:
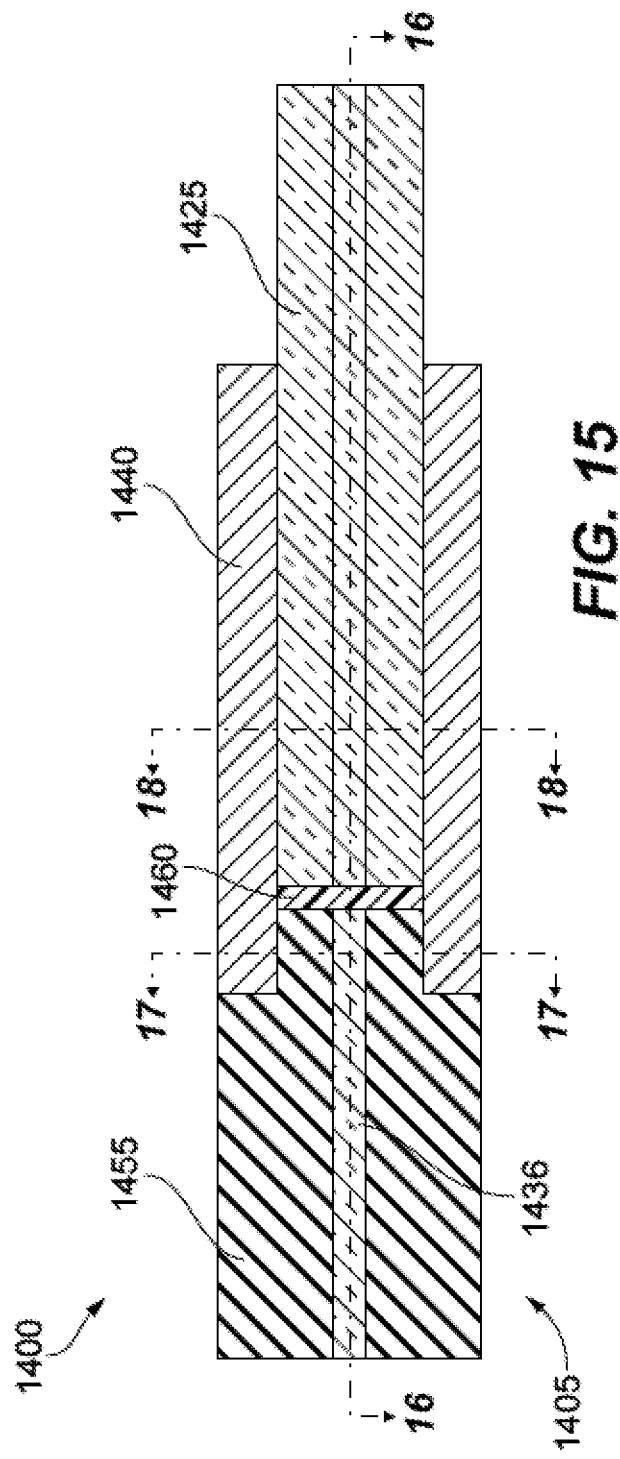
FIG. 15 shows a magnified top view of a portion of the FIG. 14 optical transceiver.
Figure 16:
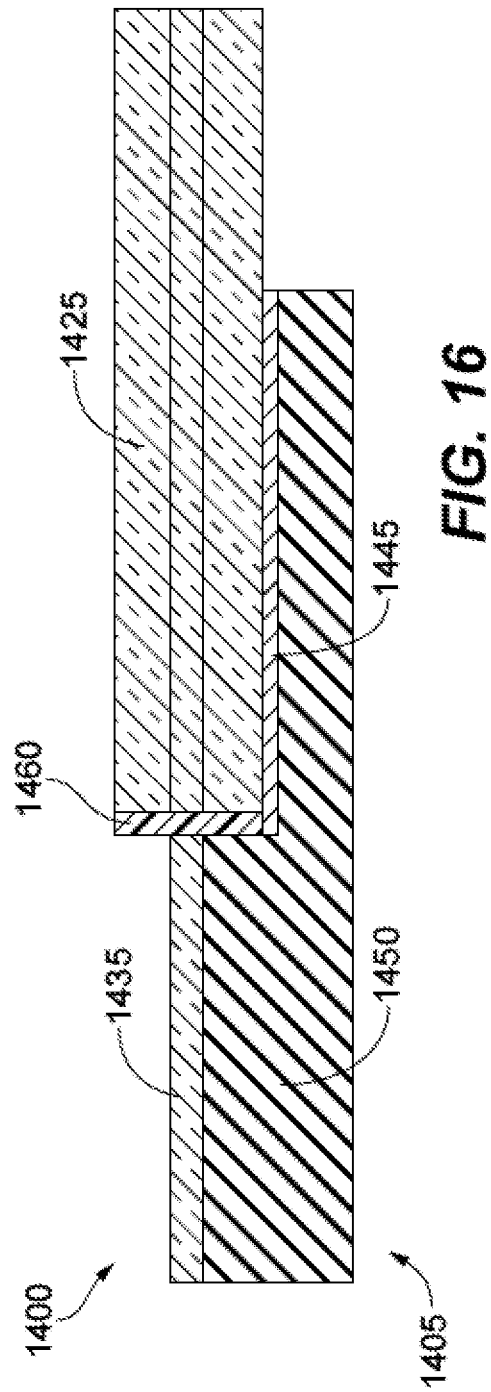
FIGS. 16-18 show various sectional views of the FIG. 15 optical transceiver portion.
Figure 17:
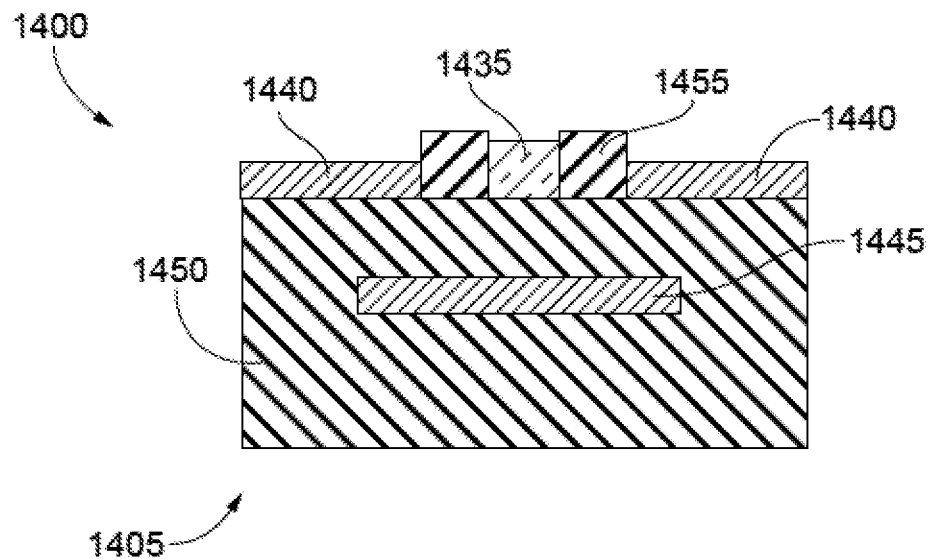
Figure 18:
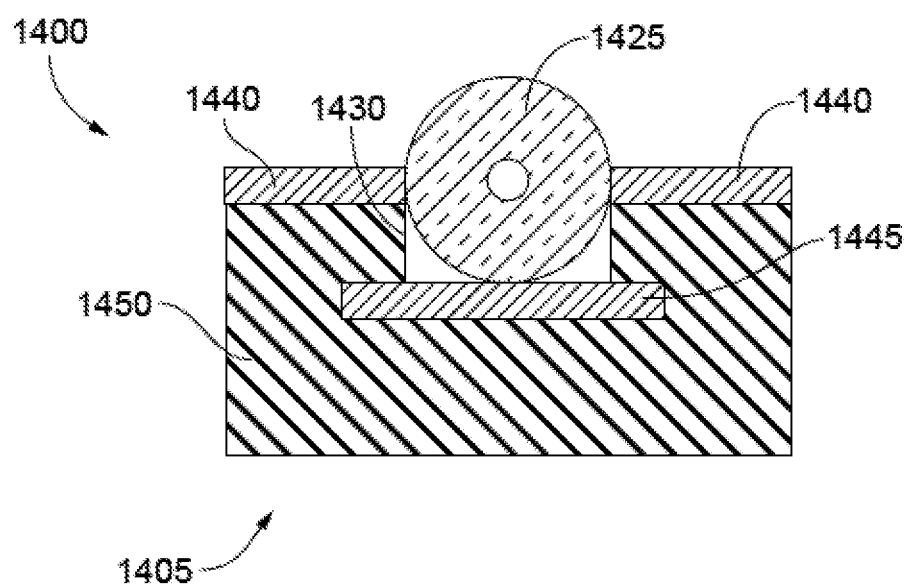

Additional aspects of the optical transceiver 1400 are shown in FIGS. 15-18, where FIG. 15 shows a magnified top view of a portion of the optical transceiver 1400 where one of the optical fibers 1425 meets one of the waveguides 1435, and FIGS. 16-18 show various sectional views cut along the planes indicated in FIG. 15. In addition to the optical fiber 1425 and the waveguide 1435, the portion of the optical transceiver 1400 in the figures further comprises top level conductive features 1440, buried conductive features 1445, insulating material 1450, a top insulating layer 1455, and optical adhesive 1460. The optical adhesive 1460 couples the end of the optical fiber 1425 to the waveguide 1435.

In one or more embodiments, the optical transceiver 1400 may be formed using a method similar to the method 500, except with the additional step of forming the waveguides 1435. As was the case for the optical transceiver 100, the grooves 1430 for the optical fibers 1425 are preferably patterned by laser ablation utilizing top level conductive features 1440 as a mask and buried conductive features 1445 as an etch stop (see e.g. FIG. 18). The waveguides 1435, on the other hand, may be formed by conventional deposition (e.g., spin coating) in combination with photolithography/etching or direct laser patterning techniques that will already be familiar to one skilled in the art. The waveguides 1435 may comprise any one of several optical polymers, which are conventionally formed by combining a variety of monomers into different configurations. Once formed in this manner, the grooves 1430 act to precisely align the optical fibers 1425 with the waveguides 1435 so as to provide efficient optical communications therebetween.

It should again be emphasized that the above-described embodiments of the invention are intended to be illustrative only. Other embodiments can use different types and arrangements of elements for implementing the described functionality, as well as different method steps for forming these elements. These numerous alternative embodiments within the scope of the appended claims will be apparent to one skilled in the art.

Moreover, methods in accordance with aspects of the invention may be utilized in the fabrication of packaged devices such as, but not limited to, optical transceivers that act to convert light signals into electrical signals, and vice versa. These packaged devices may be utilized in apparatus such as computer systems to facilitate fast data communications between two or more data processors. Such apparatus (e.g., computer systems) will also fall within the scope of this invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification and claims, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An apparatus formed at least in part by the steps of:
   forming a substrate comprising a plurality of buried conductive features and a plurality of top level conductive features, at least one of the plurality of top level conductive features defining a bond pad;
   patterning a groove in the substrate utilizing a portion of the plurality of top level conductive features as an etch mask and one of the plurality of buried conductive features as an etch stop; and
   placing at least a portion of an optical fiber into the groove to form an arrangement wherein at least a portion of the optical fiber sits in the groove adjacent to the portion of the plurality of the top level conductive features used as an etch mask, and rests on the one of the plurality of buried conductive features used as an etch stop.

* * * * *